United States Patent

[11] 3,563,357

| [72] | Inventor | William F. West<br>Sunland, Calif. |
|---|---|---|
| [21] | Appl. No. | 776,665 |
| [22] | Filed | Nov. 18, 1968 |
| [45] | Patented | Feb. 16, 1971 |
| [73] | Assignee | Harvard Industries, Inc.<br>Farmingdale, N.J.<br>a corporation of Delaware |

[54] ARTICLE CONVEYING CHUTE
19 Claims, 13 Drawing Figs.

[52] U.S. Cl. .................................. 193/25,
 198/109
[51] Int. Cl. ........................................ B65g 11/10
[50] Field of Search .......................................... 193/25,
 25AC; 198/109, 204

[56] References Cited
UNITED STATES PATENTS

| 3,135,374 | 6/1964 | Anderson ..................... | 198/109 |
| 3,250,360 | 5/1966 | Correll ......................... | 193/25(AC) |

*Primary Examiner*—Andres H. Nielsen
*Attorney*—Forrest J. Lilly

ABSTRACT: A flexible conveying chute particularly adapted to convey ammunition to and from an automatic weapon is designed to provide forward and return paths for an endless belt. The chute itself is made of modular links that provide a multiplicity of guide surfaces which adapt the chute to handling the belt whether empty or carrying live or spent ammunition. The links are molded plastic with metal guide surfaces employing a maximum of duplicate parts which make for ease of assembly and disassembly of both the links and the chute.

Patented Feb. 16, 1971
3,563,357
3 Sheets-Sheet 1
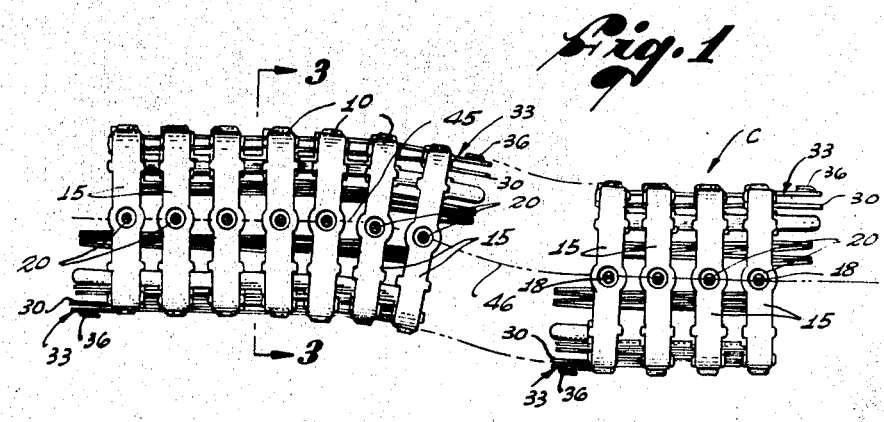
Fig. 1
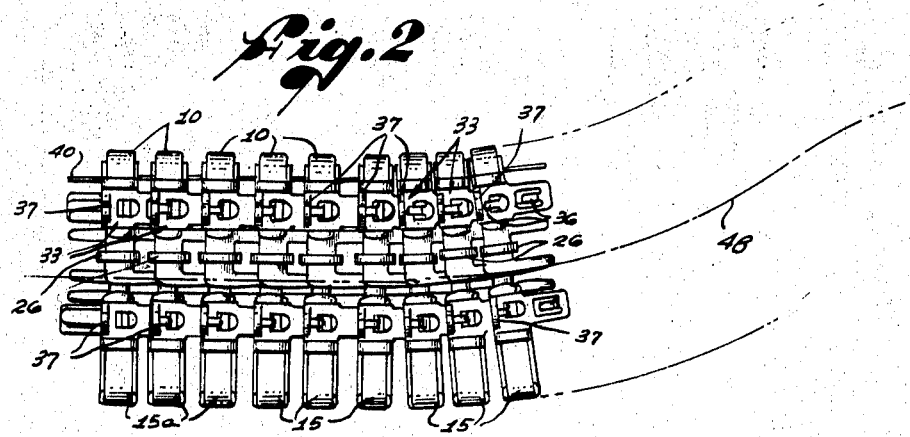
Fig. 2
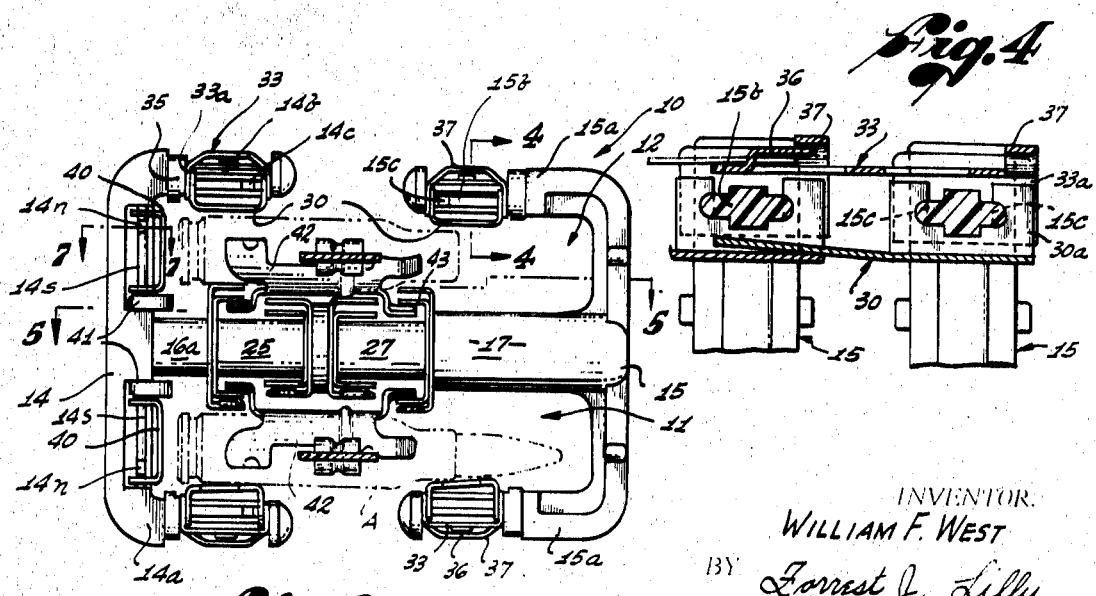
Fig. 3
Fig. 4
INVENTOR.
WILLIAM F. WEST
BY Forrest J. Lilly
ATTORNEY Patented Feb. 16, 1971
3,563,357
3 Sheets-Sheet 2
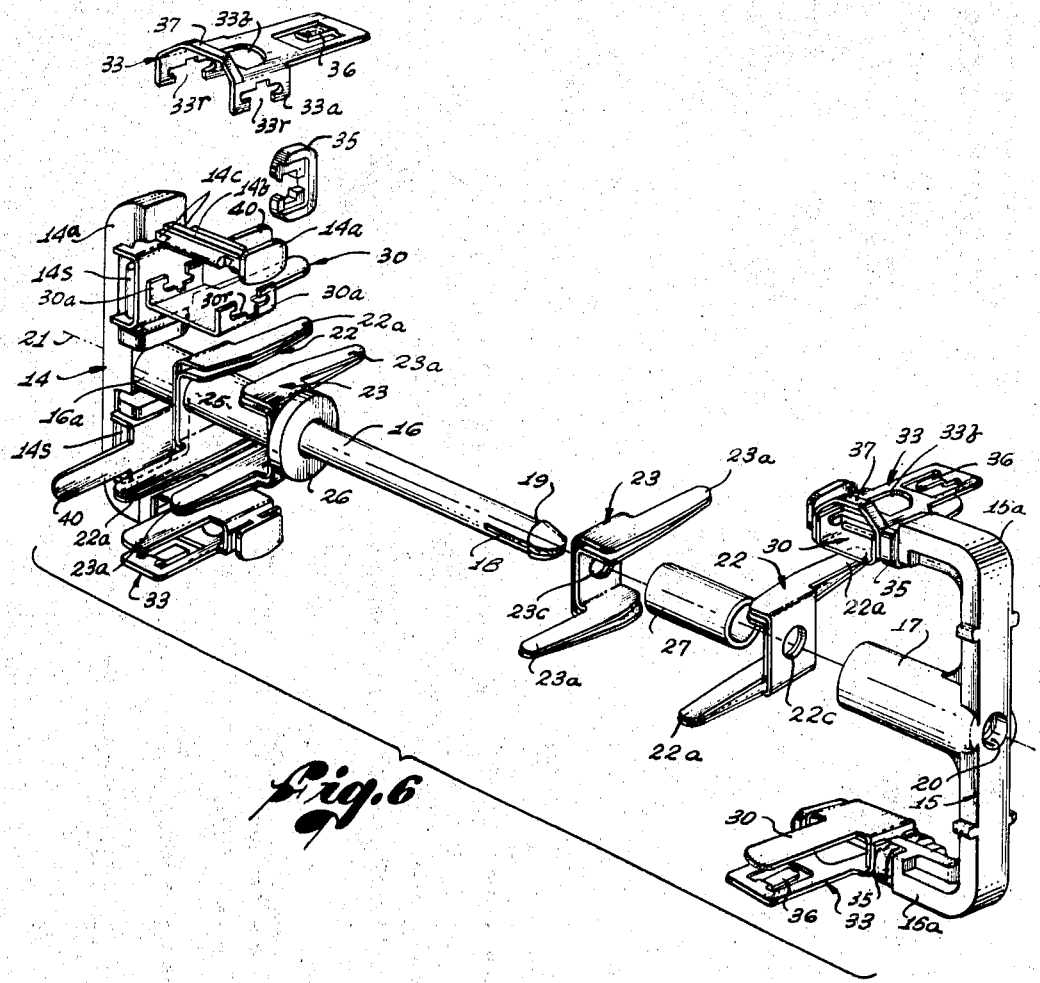
Fig. 6
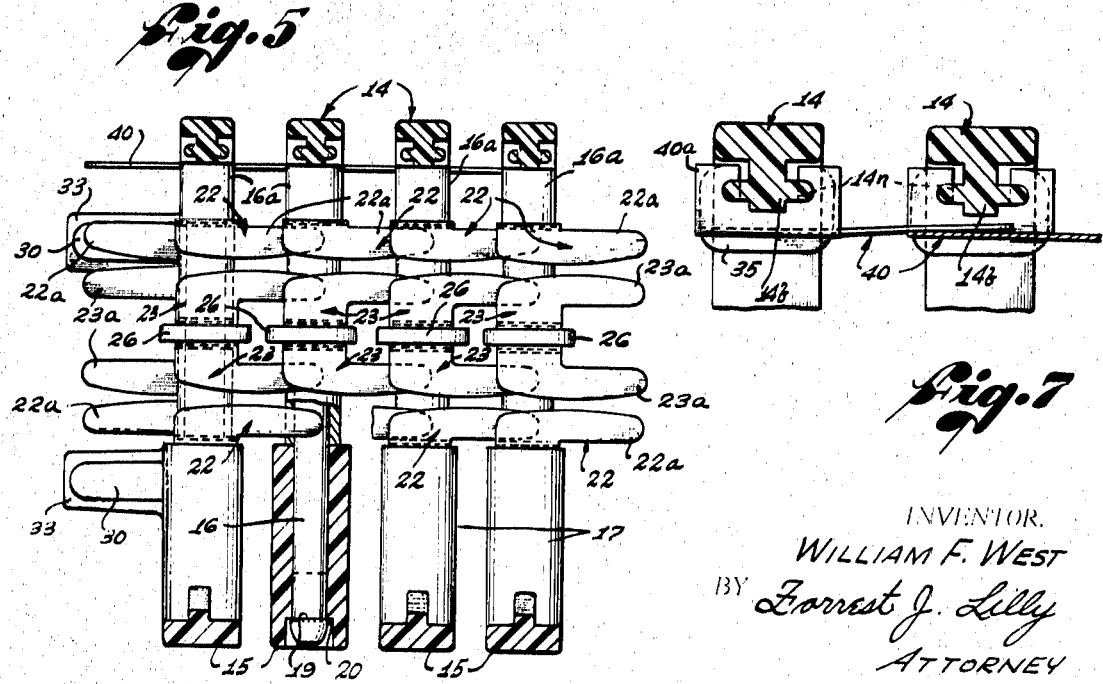
Fig. 5
Fig. 7
INVENTOR.
WILLIAM F. WEST
BY Forrest J. Lilly
ATTORNEY Patented Feb. 16, 1971
3,563,357
3 Sheets-Sheet 3
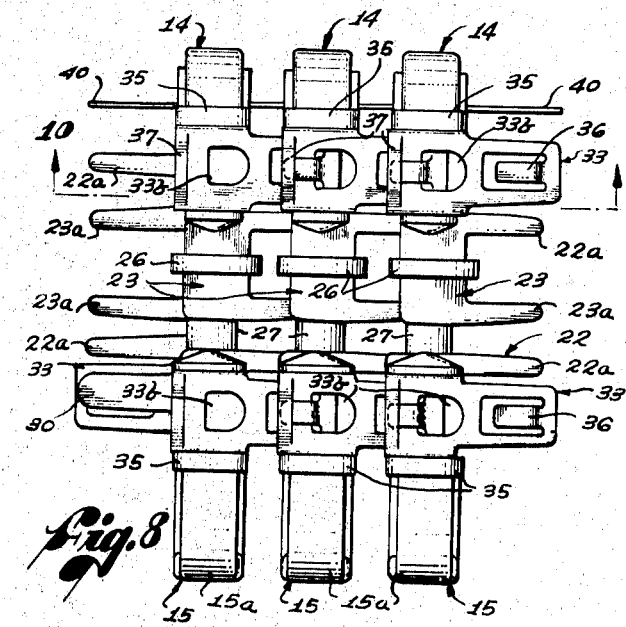
Fig. 8
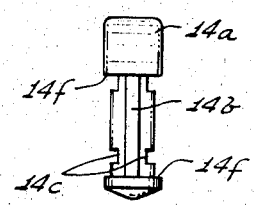
Fig. 9
Fig. 11
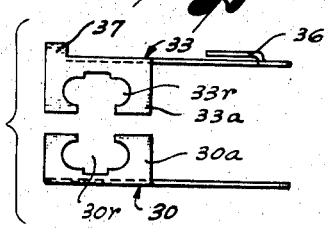
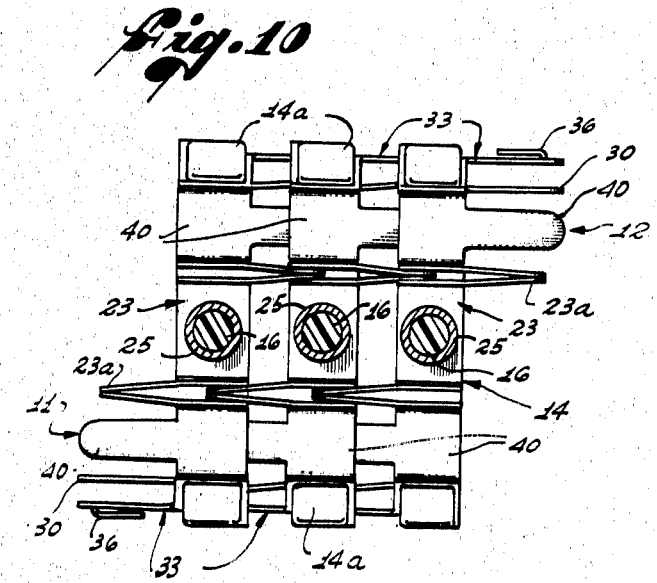
Fig. 10
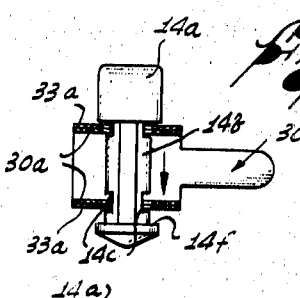
Fig. 12
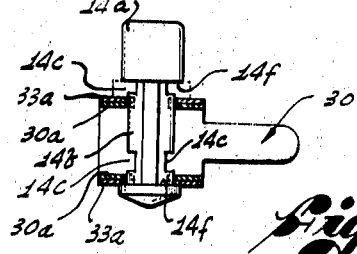
Fig. 13
INVENTOR.
WILLIAM F. WEST
BY Forrest J. Lilly
ATTORNEY

ARTICLE CONVEYING CHUTE

BACKGROUND OF THE INVENTION

The present invention relates generally to a flexible conveyor chute and more particularly to a flexible conveyor chute carrying an endless belt and providing for forward and return paths over which the endless belt travels.

In general, flexible conveyor chutes comprise a plurality of duplicate links, each of which is connected to adjoining links in a manner to permit relative movement between successive links and thus provide a desired degree of flexibility to the chute as a whole. In some known designs of conveyor chutes, the links have comprised a number of parts which have been permanently fastened together, as by riveting or welding. With links of this type, the subassembly operations are very time consuming and add to the complexity and cost of the conveyor chute.

When the subassembly operations involve welding, riveting, and the like, it becomes necessary to provide a relatively large number of tools, such as dies, assembly jigs, and the like to facilitate fabrication of the individual links. This may also be extended to similar dies and jigs or fixtures to hold the links when the links are assembled into the chute. Tooling of this character is ordinarily complex and costly and has a big disadvantage that assembly and disassembly operations of the chute and the individual links cannot be efficiently carried out under field conditions when repairs become necessary and such tooling is not available.

In order that the chute may extend from a source of stored ammunition to the weapon being served, it is usually necessary that the chute be capable of deflection in three dimensions. Ordinarily, this consists of flexibility in a transverse plane, commonly referred to in the art as "fan." Also, flexibility about an axis in said transverse plane is required, this movement being normal to the fan motion and commonly referred to as "roll." Furthermore, a change in direction that can be effected by a torsional or twisting deflection about the longitudinal axis of the chute is necessary.

While the chute to be capable of conveying ammunition from the source to a point of use has flexural capabilities as described, there is also a requirement that the chute itself possess substantial rigidity against unnecessary or excessive deflection, particularly that which may be imposed by the weight of or forces derived from the articles being conveyed. In order to obtain this rigidity in the chute, the individual frames of the links have a high degree of rigidity and the article guides and couplers on the links are designed to retain the chute in a given position once it is properly oriented.

Rigidity of the individual link frames is necessary in order to preserve the size and shape of the links themselves at all times and in order not to reduce the dimensions of the chute and the passageways therein through which the conveyed articles move. Deflection of the frames in a manner to change the size of the passageways as a result of loads imposed by the rapid movement of ammunition through the chute might cause the ammunition to become jammed in the chute, to obvious disadvantage.

Heretofore, conveyor chutes for ammunition have been designed only to provide a single passageway as the chute was only required to convey loaded ammunition to the weapon served, the ammunition-carrying belt being left empty and not returned. With some current designs of automatic weapons, an endless belt is employed which is automatically loaded at a drum or storage reservoir for ammunition, and the belt then carries the live rounds to the weapon. After passing through the weapon, the endless belt removes the empty cartridge cases from the weapon and carries them to a point of collection where they are removed from the belt; and the empty belt is then returned to the drum to be reloaded. This condition requires that the conveyor chute be capable of handling with equal facility the empty belt or the belt when loaded with either live or spent rounds of ammunition.

Thus, it is a general object of the present invention to provide an article conveying chute which is bidirectional, that is, it provides parallel passageways or paths for advance and return of articles conveyed by the chute.

It is also an object of the present invention to provide an article conveying chute which is particularly designed to pass an endless belt and to handle the belt either empty or when carrying live or spent rounds of ammunition.

A further object of the invention is to provide a flexible conveyor chute which eliminates the need for mechanical operations in the assembly of the parts of the individual links and also of the links into a chute, with attendant elimination of jigs, fixtures, dies, and the like; and which instead can be completely assembled and disassembled by manually performed operations, with the assistance of only simple hand tools.

A further object of the present invention is to provide a flexible article conveying chute in which the individual links are symmetrical and employ to a maximum degree duplicate component parts, thereby permitting economies obtained by large-scale production and reduction of the number of different parts which must be designed and carried in inventory.

Still another object of the present invention is the provision of a flexible conveyor chute of simplified construction which provides to the maximum degree possible all of the foregoing advantages.

SUMMARY OF THE INVENTION

The above and other objects of the present invention have been achieved by providing a bidirectional chute for conveying articles, more specifically for conveying ammunition, that comprises a plurality of duplicate hollow links, preferably of rectangular outline, each link having a transverse median divider. Each link is symmetrical about the longitudinal axis of the divider and guide means are provided on each link cooperating with similar guide means on adjoining links to define within the chute a pair of parallel article conveying passageways, one path conveying articles in one direction at one side of the median divider and the other path conveying articles in the reverse direction at the other side of the median divider.

The guide means on the links are disposed in a similar manner in each of the two passageways to provide a plurality of continuous guide surfaces disposed to engage and guide either an empty endless belt or ammunition carried in the belt, whether the ammunition be live or spent. In addition to the guide means, each link carries couplers which cooperate with an adjoining link to hold the links together and limit relative movement in a direction to separate the links. The guide means and the couplers all overlap one another and are designed to provide for relative movement whereby the chute can be curved about a fan radius or a roll radius, or can twist about its longitudinal axis.

In a preferred embodiment, each link comprises a pair of frame members which are molded from a rigid plastics material which is of relatively low density and high impact strength. Mounted on these frame members are the couplers and guide elements which are metal elements formed as stampings of sheet metal. The stampings are provided with recesses adapted to fit over noncircular sections on the frame sections, whereby the individual links can be assembled manually. Each link has two main frame sections which are mounted together by a post and collar arrangement which forms the median divider of the link, all parts mounted on the post being rotatable about the post, thereby permitting the link to change shape as may be required to impart the desired flexural characteristics to the assembled conveyor chute.

BRIEF DESCRIPTION OF THE DRAWINGS

FIG. 1 is a side elevation of a segment of conveyor chute embodying the present invention showing "roll" movement;

FIG. 2 is a top plane view of a segment of the conveyor chute showing "fan" movement;

FIG. 3 is an enlarged vertical transverse section on line 3—3 of FIG. 1 showing one link in side elevation;

FIG. 4 is a further enlarged fragmentary section on line 4—4 of FIG. 3;

FIG. 5 is a fragmentary section of the chute on line 5—5 of FIG. 3, rotated 90° counterclockwise;

FIG. 6 is an exploded view of a single link of the conveyor chute;

FIG. 7 is a further enlarged fragmentary section on line 7—7 of FIG. 3;

FIG. 8 is an enlarged top plan view of a plurality of connected links;

FIG. 9 is a top plan view of the arm of one frame section;

FIG. 10 is a vertical section on line 10—10 of FIG. 8;

FIG. 11 is a side elevation of a coupler and an associated guide element removed from the frame section arm; and FIGS. 12 and 13 are views similar to FIG. 9 showing two successive stages in the assembly of guide elements on a frame section arm.

DESCRIPTION OF A PREFERRED EMBODIMENT

In general, the ammunition chute C constructed according to the present invention comprises a plurality of duplicate links 10, each of generally rectangular shape in outline and provided with a plurality of guide elements which provide internal guide surfaces that slidingly engage the articles being conveyed, in this case ammunition in an endless belt or the empty belt alone. A first guideway or passage 11 is provided in the lower portion of the chute and a second guideway or passage 12 is provided in the upper portion of the chute, as shown in FIG. 3. The two passages are designed to direct ammunition moving in opposite directions and may be assumed to direct ammunition and/or the belt in the forward and return directions, respectively.

The construction and characteristics of the chute C can best be appreciated by first considering in detail the construction of a single link 10. A single assembled link is shown in side elevation in FIG. 3 and in greater detail in FIG. 6 in which the link is shown partially disassembled. From these two figures, it will be seen that each link comprises a pair of generally similar, but not duplicate, frame sections 14 and 15 that are each generally U-shaped. Frame section 14 carries a centrally located post 16 which, as will be further explained, is engaged within collar 17 on the opposite frame section 15 to provide not only a pivotal connection between the two frame sections but a median divider extending transversely of the link between the two article paths 11 and 12.

The free end of post 16 is split longitudinally at 18 to divide the terminal portion of the post into two halves which can spring apart after being pressed together. The split end of the post is tapered and is provided with an inwardly facing shoulder 19. When each link is assembled fully, the post 16 is in a central bore in collar 17 on frame section 15 (FIG. 5), and at one end of the collar is shoulder 20 between two sections of the central bore of different diameter. Shoulder 20 engages the oppositely facing shoulder 19 on post 16 when the post is fully inserted in the collar. The split at the end of the post allows the tip of the post to contract enough that the enlargement at shoulder 19 on the post passes through the collar, and the split ends then spread apart to engage shoulders 20 and 19. This arrangement holds the two frame sections together in a link but allows the two sections to turn angularly with respect to each other about the longitudinal axis 21 of the post and collar.

When engaged as just described, post 19 and collar 17 combine to provide a median divider on opposite sides of which are the two article conveying paths 11 and 12, as may be seen particularly in FIG. 3. Post 16 has a base section 16a which is of larger diameter than the remainder of the post. On the smaller diameter portion of the post, there are mounted a plurality of guide elements 22 and 23 that engage and guide the articles moving along these paths. These guide elements are carried on the median divider.

Guide elements 22 and 23 are provided in pairs, the members of each pair facing oppositely to each other along post 16, thus providing left-hand and right-hand guide elements. Elements 22 and 23 are alike in that each has the same general shape, but the elements are of different sizes, the inner elements 23 being smaller than the outer elements 22, that is, the guide surfaces provided by arms 23a are closer to axis 21 than are the guide surfaces provided by arms 22a.

Each of the individual guide elements 22 and 23 is constructed in the same manner. Each is formed from two similar metal stampings. Each stamping has a flat center plate in which is an opening 22c or 23c (FIG. 6). The arms 22a or 23a are formed by lateral portions of the stampings bent at right angles to the central portion containing the circular openings.

Two stampings are nested together with the central openings in alignment and with the arms of the two stampings spaced apart at one end. The free ends of the arms are then fastened together, as by spot welding, with the result that the completed guide element has a pair of parallel, oppositely extending arms 22a or 23a as the case may be, which are of tapered shape and are like a cantilever spring. Each of these cantilever arms or leaves is in effect hollow as the arms of the individual stampings are spaced apart in one end.

The central openings 22c and 23c in the guide elements are sized to fit snugly on the small diameter section of post 16. This section of the post being cylindrical and the openings being circular, the elements can swing about the axis of the post.

To assemble a link 10, a guide element is placed on post 16 and advanced on the post into contact with the shoulder at the joint between the main section of the post and the larger diameter base 16a. Then, there is added a long spacer 25, after which one of the smaller guide elements 23 is placed on the post in a similar manner and advanced into engagement with the other end of spacer 25. Next, a short spacer 26 is placed on the post on the opposite side of and in contact with short spacer 26. Next, another long spacer 27 is added followed by a second larger guide element 22. It will be noticed that the last two guide elements 22 and 23 face oppositely to the first two guide elements mounted on the post, the reasons for which will become apparent. The final step in assembly of the link is mounting the second frame section 15 on the post. This is done by inserting the post in collar 17, the total length of the post being such that shoulder 19 on the post engages shoulder 20 on the frame section. This engagement holds the link in assembled position as shown in FIG. 5 when the parts are assembled in the sequence just described.

As can be seen in FIG. 6, all of the arms 22a and 23a at one side of the median divider extend in one direction where they form guide elements in one of the article paths 11 and 12 while all of the arms of the guide elements on the other side of the median divider extend in the opposite direction in the other of the two article paths.

Post 16 provides a pivotal mounting for the guide elements and spacers on it. This pivotal movement of the guide elements and the freedom of the two frame sections to rotate angularly with respect to one another permits a torsional or twisting motion of the successive links in the assembled ammunition chute about the longitudinal axis of the chute.

As already mentioned, the two frame sections 14 and 15 are generally similar in outline but are not duplicates of each other as there are differences in dimensions. Each frame section is generally U-shaped and comprises a base at the ends of which are two parallel arms. The arms are designated 14a and 15a on frame sections 14 and 15, respectively. An arm 14a is shown in FIG. 9. It will be seen in FIG. 3 that on each of the arms 14a and 15a is a guide leaf 30, the leaf and an arm 15a being shown in greater detail in FIG. 4.

From FIGS. 4, 6, and 11, it will be seen that each of the guide elements 30 is a metal stamping and it consists essentially of a flat leaf spring with a pair of parallel flanges 30a near one end. These flanges at the sides of the leaf spring are formed by bending lateral portions of the flat leaf to become generally normal to the plane of the leaf, and are provided for attachment of the guide element to an arm 14a or 15a of a frame section.

For mounting guides 30, each arm 14a is provided with a section 14b of noncircular cross section located between spaced transverse faces 14f on the frame arm, as seen in FIGS. 9 and 6. This portion 14b of the frame arm 14a between faces 14f, shown in FIG. 9, is ribbed in order to provide maximum resistance to bending and is accordingly generally cruciform in cross section. The flanges 30a on each guide element 30 are provided with a recess 30r of the same shape, the recess being open to one free edge of the flange (FIG. 11). The opening to the edge of the flange is narrower than the maximum dimension of the recess and is of a proper size to fit over the arm section only where the frame arm is narrowed by a pair of notches 14c. The notches 14c locally reduce the width of the arm section 14b to permit engagement of the guide element flanges and the frame arm by movement of the guide transversely of the arm (up or down in FIG. 6). The guide element is now in the position of FIG. 12, and is next moved longitudinally along the arm section 14b (in a direction indicated by the arrow in FIG. 12 toward the center of the chute link with the construction shown) to bring the flanges of the guide leaf onto an unnotched portion of the arm section beyond notches 14c, as in FIG. 13. Arms 15a on the other frame section 15 have similarly shaped sections 15b (FIG. 4) with notches 15c whereby other guide elements 30 can be mounted thereon in a similar manner.

Guide elements 30 are four in number on each link. All of these guide elements engage and guide the articles moving along the paths 11 and 12. In FIG. 3, it will be seen that two of the elements 30 are disposed in path 11 where they engage the forwardly moving full rounds of ammunition whereas the other two guides 30 are in the path 12 which is the return path. In path 12, contact with the empty cartridge cases in effected.

Each arm 14a and 15a of the frame section also carries coupling means for connecting together adjoining links of the chute. The coupling means consist of a plurality of elements 33 which are shaped very much like the guide elements 30 just described. An element 33 comprises a flat leaf spring with a pair of parallel flanges 33a, one at each of two opposite edges. These flanges are recessed with openings 33r of the same shape as those described above in guide elements 30 to permit mounting of the coupling units 33 on the same cruciform arm sections 14b and 15b that carry the guide elements 30. As shown in FIGS. 3 and 12, two flanges 33a are spaced far enough apart to straddle the flanges 30a of a guide element 30 with the coupling element mounted on the same frame arm in the same manner as the guide element.

To hold both the coupling members and the guide elements in final position (FIG. 13) on the frame arms 14a or 15a beyond the notches 14c or 15c, snap rings 35 are used. These rings are more or less U-shaped and open at one side to permit their attachment to arm sections 14b or 15b. On an arm section, the snap ring prevents movement of the guide elements and coupling means along the arm into registration with notches 14c where the guide element and coupling link can be removed.

A major difference between the couplers 33 and guide elements 30 is that the couplers have two openings in the flat leaf portion; and at one opening, a tonque 36 is lanced and raised above the plane of the surrounding lead. The second opening 33b is spaced from the first one and is designed to receive the tongue 36 of an adjoining coupler in a manner that will be further explained. At the end of the leaf adjoining the second opening, a raised keeper 37 is provided. This keeper is optional and is provided to afford protection to the tongue 36 when the links are assembled into a chute.

In addition to the several guide elements described above, each link 10 has two further guides 40 that are particularly located and adapted to engage the ends of the articles being conveyed. In the case of a chute used to convey ammunition, these guides 40 are located at the base or primer end of the ammunition. As shown in FIG. 3, contact between the rounds of ammunition and the guides 40 may not occur at all positions or all times. Contact may be intermittent or it may be at only certain locations along the chute, as where the chute changes direction in a manner that brings the rounds of ammunition into contact with guides 40. This intermittent or localized character of contact of the conveyed articles with the guides 40 may also be true of all other guides because of the tolerances or clearances that are necessarily built into the ammunition chute to permit it to function adequately at various bends or changes in direction. Also, gravity or other forces may cause the belt and articles carried thereby to contact certain guide elements and not others.

Guides 40 are duplicates of guides 30 to be interchangeable therewith. This is done to reduce the number of different designs of parts in an individual link and to use the same part in as many places as possible in order to obtain production economies.

Accordingly, each guide 40 has a pair of parallel flanges 40a, one at each side of the guide in a manner which will be understood from the description above of guides 30. These flanges 40a have notches by which the guides are mounted on frame section 14 in one of the two areas 14s shaped to receive the notches in the guide flanges. These areas 14s are similar in cross section to the sections 14b, as may be ascertained by comparison of FIGS. 4 and 7. Notches 14n provide zones of lesser width at which the guides 40 may be placed on the mounting area 14s, then moved laterally, snap rings 41 being provided to hold the guide elements in place. The construction and assembly procedure follows the general pattern already established for guide elements 30.

From inspection of FIG. 6, it will be seen that any one of the component parts of a link 10 mounted upon post 16 can be rotated 180° from an operational position and restore the link to its initial shape. Consequently, the link may be defined as being symmetrical about post axis 21. This characteristic design arises from the fact that there are two passageways through which articles move, but movement in the passageways is in opposite directions.

Links 10 are constructed and assembled individually as described. The sequence of assembly stops is of no consequence, though the guide elements and couplers are ordinarily assembled on the frame sections before the two sections 14 and 15 are joined together. These completed links comprise modules which can be connected together in any desired number to provide an article conveying chute of the desired length. A plurality of these modular links 10 connected together to form a segment of the chute are shown in FIGS. 1 and 2, and in greater detail in FIG. 5.

Each link is connected to an adjoining link by four coupling elements 33, two in each direction. By bringing two links toward each other while they are disposed in generally parallel planes, the free flat end of a coupler 33 on one link can be moved across a coupler on an adjoining link to bring tongue 36 of the first link into the opening 33b of the coupler on the second link. Tongue 36 then springs out through the opening and engages the coupler on the second link. In this manner, the links are held against separation. At the same time, the couplers can still slide for a limited extent with respect to each other, the range of possible movement being determined by the lengths of tongues 36 and the openings 33b. The chute is constructed by bringing successive links together in this manner, one at a time, to obtain the desired length of chute. The assembly operation causes all of the article guide elements to come into overlapping relationship in the manner of shingles on a roof. All of the guide elements at one side of the median divider overlap in one direction, while all of the guide elements at the other side of the median divider overlap in the other direction. For example, see guides 40 in FIG. 10. The result is that the completed chute establishes two article passageways 11 and 12 adapted to movement of the articles therein in opposite directions. The direction of overlap is such that with reference to FIG. 3, articles in the upper path 12 are approaching the viewer, while articles in the lower path 11 are receding from the viewer; but, of course, the direction of movement in the passageways can be reversed by inverting the chute or reversing it end-for-end.

The overlapping guide elements have a sliding contact with each other which permits limited relative movement of successive guide elements. The range of this movement is such that the guide elements do not move out of contact with one another.

The thin, spring leaves of the guide elements are individually comparatively flexible, and it is preferred to stiffen these members without increasing the weight more than necessary. This stiffening is accomplished in the case of guide elements 22 and 23 mounted on the median divider by forming each guide element of a pair of metal stampings of slightly different size and joining the outstanding arms 22a or 23a together at their tips. Thus, the arms are stronger and stiffer than would be the case if only a single stamping were used.

In assembling the chute, the relatively thinner outstanding ends of the arms 22a and 23a are inserted in the open ends of the guide elements of the adjoining link so that the tip of each guide element is confined in two directions by the adjoining guide element, as seen especially in FIG. 10. Although an individual guide element 22 or 23 is free to turn on post 16 about axis 21 when the completely assembled link is a separate article, the guide elements are held against this rotational movement when the links are assembled into a chute because of the mutual engagement of successive guide elements.

The design and construction of the links and their component parts are such that all assembly and disassembly operations can be carried out manually. Assistance from a simple hand tool such as a screw driver is very helpful; and in field operations, any hard object, such as a round of ammunition, is adequate for that purpose.

From FIG. 3, it will be seen that the arms of guides 22 and 23 are staggered relative to each other in a direction normal to the axis 21. This arrangement is designed primarily to engage links 42 of the endless belt carrying the ammunition. Each link 42 has a pair of laterally extending angular lugs 43, one lug being at each of two opposite sides of the belt link. The outer faces of the shorter guides 23 engage the main portion of the belt link 42 between the lugs while the annular lugs 43 extend between the adjacent guides 22 and 23 to engage the inner faces of guides 22. In this manner, the belt links are engaged to guide them by either guides 22 or 23, depending upon whether gravity or other forces urge the belt into engagement with one or the other guides. In addition, the belt link is held against lateral movement. This engagement of the belt links by guides 22 and 23 is of particular concern when the belt links are empty, that is they contain no full or spent rounds of ammunition. When the belt links are empty, only guides 22 and 23 engage the belt to guide it; but when either full or spend rounds are being carried by the belt, then contact with these articles may, in effect, override the guiding action of elements 22 and 23.

Guide elements 30 are located and spaced in each path 11 and 12 to engage the cartridge cases, whether loaded or empty; but in FIG. 3, it will be seen that contact may be had also with the projectile of a full round by one series of guides 30. Two rows of guides 30 are provided in each of the passageways 11 and 12 to contact the rounds of ammunition at two points.

Associated with each guide 30 is a coupler 33, the two extending in the same direction and generally parallel to each other from the location of their mounting on one frame arm. These two members are inserted between the corresponding coupler and guide members on an adjoining link, as shown in FIG. 4. This causes the associated guide and coupler members on a link to cooperate with each other to give a relatively stiffer and stronger connection than would be possible with either one alone, yet without any limitation upon the freedom of corresponding members of one link to move relative to the members of an adjoining link. Base guides 40 are designed to engage the ends of the cartridges, either loaded or spent, carried by the endless belt and consequently are not operative when the belt is not loaded. These members 40 are in simple overlapping relationship after the successive links are assembled into a completed chute.

The connection between successive links is such that relative movement of adjoining links in parallel planes and in a direction transverse to the axis of the chute is negligible. However, the links have limited freedom to move toward and/or away from each other and they can assume positions angular with respect to one another to permit the chute axis to assume a roll arc as at 45 or 46, as shown in FIG. 1. Likewise, successive links can move toward and/or away from each other and angularly to permit the chute axis to assume a fan arc as at 47 or 48, as shown in FIG. 2. The chute can bend either up or down or to one side or the other as may be required. In addition, the sliding movement of the guides permits the chute to twist about its longitudinal axis.

From the foregoing description, it will be understood that various changes may be made in the specific or detailed construction and arrangement of the elements comprising individual links and the assembled chute, without departing from the spirit and scope of the present invention. Consequently, the foregoing description is considered as being illustrative of, rather than limitative upon, the disclosure of the invention.

I claim:

1. A flexible bidirectional chute for conveying articles carried on an articulated carrier, comprising:
    a plurality of duplicate hollow links each having a transverse median divider of which each link has means slidably engaging and directing two oppositely moving runs of said articulated carrier; and
    guide means on each link cooperating with similar guide means on adjoining links to define within the chute a first path for conveying articles in one direction at one side of the divider and a second path for conveying articles in the reverse direction at the other side of the divider.

2. A flexible bidirectional chute according to claim 1 in which each link is symmetrical about the longitudinal axis of the divider.

3. A flexible bidirectional chute according to claim 1 in which the guide means include means on each divider for slidably engaging an article in each path.

4. A flexible bidirectional chute according to claim 1 in which the guide means on each link includes:
    leaves on each divider extending therefrom in opposite directions at opposite sides of the divider; and
    said leaves slidably engaging and overlapping corresponding leaves on adjoining links, the overlap being in opposite directions in the two paths.

5. An ammunition chute for conveying full rounds in one direction and returning spent rounds, said rounds being carried in articulated links of an endless belt, comprising:
    a plurality of duplicate hollow links;
    coupling means on each link cooperating with similar coupling means on adjoining links to interconnect the links for limited relative movement; and
    guide means on said links defining a first path extending longitudinally of the chute for conveying the endless belt and ammunition forwardly and other guide means defining a second path parallel to the first path for conveying the endless belt and spent ammunition in the return direction.

6. An ammunition chute as in claim 5 in which each link has a transverse median divider and the two paths for conveying are at opposite sides of the dividers.

7. An ammunition chute as in claim 6 in which each chute link is symmetrical about the longitudinal axis of the divider.

8. An ammunition chute as in claim 6 in which the guide means on each divider slidably engages the belt links in each path.

9. An ammunition chute as in claim 6 in which the guide means on each chute link includes:

leaves on the link divider extending in opposite directions at opposite sides of the divider; and said leaves slidably engaging in overlapping relation corresponding leaves on adjoining links, the direction of overlap at one path being opposite of the direction of overlap at the other path.

10. An ammunition chute as in claim 9 in which the leaves on the link divider are arranged in two sets, the leaves of each set being at one side of the divider and extending in the same direction, and leaves in each set being offset from one another in a direction transverse to the divider and also axially of the divider, whereby the spring leaves receive and guide angular lugs on the endless belt.

11. An ammunition chute as in claim 5 in which each chute link comprises two frame sections providing peripheral portions of the two paths and means interconnecting the two sections forming a median divider, the two frame sections being relatively movable angularly about the axis of the divider.

12. An ammunition chute as in claim 5 in which each chute link is of generally rectangular outline and comprises: two U-shaped frame sections providing peripheral portions of the two paths and means interconnecting the two sections and separating the two paths;

in which the coupling means comprises leaves on said two link sections slidably engaging corresponding leaves on an adjoining chute link; and leaves on each link including spring detents releasably engaging an adjoining leaf and holding an adjoining link against separation.

13. A modular link of an ammunition chute, comprising:
a pair of U-shaped frame sections;
means detachably connecting together the two frame sections in opposed relation to form a generally rectangular link;
ammunition guide elements mounted on the link cooperating with similar elements on an adjoining link;
coupling elements mounted on the link for engagement with similar elements on an adjoining link; and the guide elements and coupling elements extending in opposite directions from the link and arranged symmetrically about a transverse axis passing through both frame sections.

14. A modular link for an ammunition chute, comprising:
a pair of opposed U-shaped frame sections;
means detachably connecting the frame sections together to provide a median divider extending between the frame sections with the arms of one U-shaped section in spaced relation to the arms of the other section; and
said connecting means permitting relative angular movement of the two frame sections.

15. A modular link as in claim 14 in which the frame connecting means comprises a post and collar arrangement, the end of the post being split and having shoulder means releasably engaging the collar whereby the frame members can be assembled and disassembled manually.

16. A modular link as in claim 14 that also comprises article guide means including guide elements carried on the arms of the U-shapes and on the divider, the elements on the median divider being pivotally mounted thereon.

17. A modular unit as in claim 16 in which the individual guide elements carried on the divider each comprises a cantilever member open at one end to receive the end of a corresponding member on an adjoining link and tapering outwardly to a relatively thinner free end.

18. A modular unit as in claim 16 in which the guide means includes guide elements carried on the arms of the U-shapes, the last mentioned elements being nonrotatably mounted on the arms of the U-shapes.

19. A modular unit as in claim 18 in which the U-shaped frame members and the means connecting the frame members are molded of synthetic resin and the guide elements are steel stampings.